(12) United States Patent
Ramakrishnan et al.

(10) Patent No.: US 11,086,549 B2
(45) Date of Patent: Aug. 10, 2021

(54) JUST-IN-TIME DATA MIGRATION IN A LIVE SYSTEM

(71) Applicant: International Business Machines Corporation, Armonk, NY (US)

(72) Inventors: Arun Ramakrishnan, Chennai (IN); Rajan Raman, Bengaluru (IN); Preeti Rajashekhar Kottalagi, Bengaluru (IN); Yochana S. Honnavar, Bengaluru (IN); Lance Loy Rodrigues, Pune (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/418,362

(22) Filed: May 21, 2019

(65) Prior Publication Data

US 2020/0371705 A1 Nov. 26, 2020

(51) Int. Cl.
*G06F 3/06* (2006.01)
*G06F 9/48* (2006.01)

(52) U.S. Cl.
CPC .......... *G06F 3/0649* (2013.01); *G06F 3/0604* (2013.01); *G06F 3/067* (2013.01); *G06F 9/4856* (2013.01)

(58) Field of Classification Search
CPC ...... G06F 3/0649; G06F 3/0604; G06F 3/067; G06F 9/4856
See application file for complete search history.

(56) References Cited

U.S. PATENT DOCUMENTS

| 5,564,037 | A | 10/1996 | Lam |
| 2005/0020259 | A1* | 1/2005 | Herrero ................... H04W 8/12 455/433 |
| 2007/0106710 | A1 | 5/2007 | Haustein et al. |
| 2009/0262723 | A1* | 10/2009 | Pelletier ................... H04L 12/66 370/352 |
| 2009/0282089 | A1 | 11/2009 | Lakshmanachar et al. |
| 2011/0023048 | A1 | 1/2011 | Srinivasan et al. |

(Continued)

OTHER PUBLICATIONS

Francis "The Date Migration Journey: Why and How to Migrate", May 23, 2018, Copyright 2018, WorkingMouse Pty Ltd., 5 pages. https://workingmouse.com.au/cloud-migration/data-migrationjourney.

(Continued)

*Primary Examiner* — Nanci N Wong
(74) *Attorney, Agent, or Firm* — Yee & Associates, P.C.

(57) ABSTRACT

Just-in-time data migration in a live system is provided. Changes in a subscription that include structure, syntax, semantic, and identifier changes in data corresponding to the subscription are indicted to a new target system. A request to run an operation corresponding to the subscription on the new target system is received from a client device user. It is determined whether the operation needs related subscription data from a legacy system. In response to determining that the operation does need the related subscription data from the legacy system, the related subscription data for the operation is transformed just-in-time to support just-in-time migration of the related subscription data from the legacy system to the new target system. The operation is run on the new target system generating a new identifier for the subscription while referencing the related subscription data being migrated just-in-time from the legacy system.

20 Claims, 5 Drawing Sheets

(56) References Cited

U.S. PATENT DOCUMENTS

| | | |
|---|---|---|
| 2012/0089711 A1 | 4/2012 | Zager et al. |
| 2012/0329521 A1* | 12/2012 | Jacobs .................. H04W 12/35 |
| | | 455/558 |
| 2015/0193248 A1* | 7/2015 | Noel .................. G06F 9/45558 |
| | | 718/1 |
| 2016/0140194 A1* | 5/2016 | Chang .................. G06F 16/214 |
| | | 709/203 |
| 2018/0137112 A1 | 5/2018 | Barbas et al. |
| 2018/0183869 A1 | 6/2018 | Sanderson |
| 2018/0213036 A1 | 7/2018 | Vasetsky et al. |
| 2018/0288077 A1* | 10/2018 | Siddiqui ................ G06F 21/56 |
| 2018/0293233 A1 | 10/2018 | Higginson et al. |

OTHER PUBLICATIONS

IBM, "A method to migrate large data in multiple phases," An IP.com Prior Art Database Technical Disclosure, Aug. 26, 2008, IP.com No. IPCOM000174098D, 3 pages.

Anonymous, "Method and System for Zero Downtime Data Migration driven by user activity," An IP.com Prior Art Database Technical Disclosure, Dec. 2, 2015, IP.com No. IPCOM000244319D, 17 pages.

IBM, "A system and method for improving data migration," An IP.com Prior Art Database Technical Disclosure, Jul. 15, 2009, IP.com No. IPCOM000185197D, 8 pages.

\* cited by examiner

JUST-IN-TIME DATA MIGRATION IN A LIVE SYSTEM

BACKGROUND

1. Field

The disclosure relates generally to data migration and more specifically to migrating subscription data just-in-time from a source legacy system to a new target system.

2. Description of the Related Art

Data migration is the process of selecting, preparing, extracting, and transforming data and transferring the data from one computer system to another. Additionally, the validation of migrated data for completeness and the decommissioning of legacy data are considered part of the entire data migration process. Data migration is a key consideration for any system implementation, upgrade, or consolidation, and is typically performed in such a way as to be as automated as possible, freeing up human resources from tedious tasks. Data migration occurs for a variety of reasons, including server or storage equipment replacements, maintenance or upgrades, application migration, website consolidation, disaster recovery, and data center relocation.

Typically, there are three main phases to most data migration projects: planning, migration, and post-migration. During planning, dependencies and requirements are analyzed, migration scenarios get developed and tested, and a project plan that incorporates the prior information is created. During the migration phase, the plan is implemented. During post-migration, the completeness and thoroughness of the migration is validated, documented, and closed out, which includes any necessary decommissioning of legacy systems. For applications of moderate to high complexity, these data migration phases may be repeated several times before the new system is considered to be fully validated and deployed. Factors to consider during data migration may include how long the migration will take to complete; the amount of downtime required; and any risk to the business due to technical compatibility issues, data corruption, application performance issues, and missed data or data loss.

SUMMARY

According to one illustrative embodiment, a computer-implemented method for just-in-time data migration in a live system is provided. A computer indicates changes in a subscription that include structure, syntax, semantic, and identifier changes in data corresponding to the subscription to a new target system. The computer receives a request to run an operation corresponding to the subscription on the new target system from a client device user. The computer determines whether the operation needs related subscription data from a legacy system. In response to the computer determining that the operation does need the related subscription data from the legacy system, the computer transforms the related subscription data for the operation just-in-time to support just-in-time migration of the related subscription data from the legacy system to the new target system. The computer runs the operation on the new target system generating a new identifier for the subscription while referencing the related subscription data being migrated just-in-time from the legacy system. According to other illustrative embodiments, a computer system and computer program product for just-in-time data migration in a live system are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
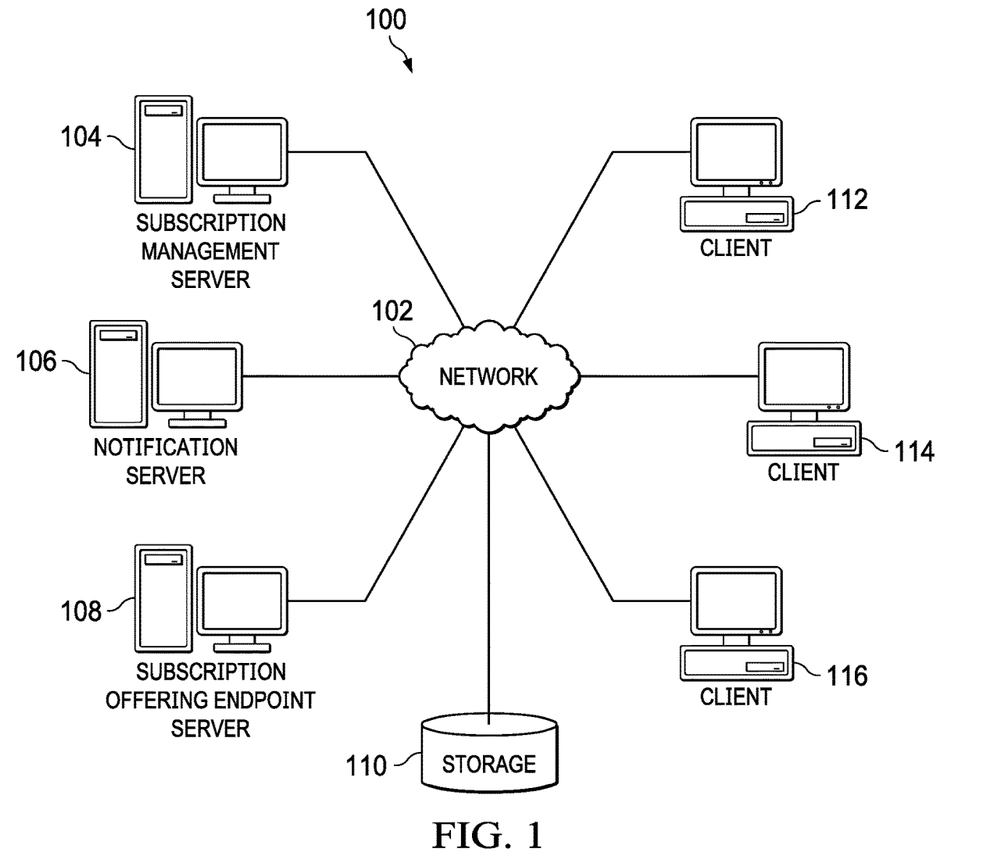
FIG. 1 is a pictorial representation of a network of data processing systems in which illustrative embodiments may be implemented.
Figure 2:
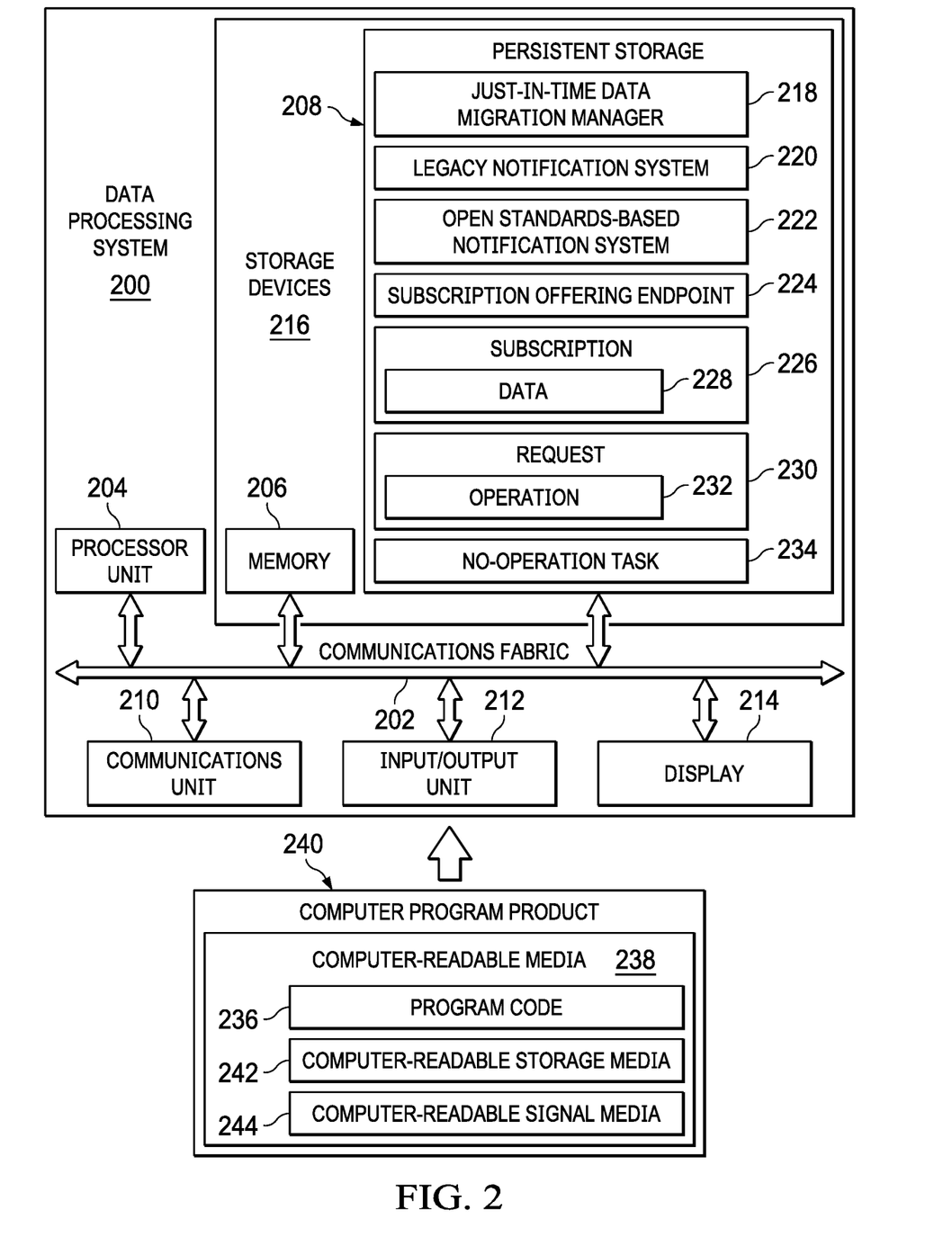
FIG. 2 is a diagram of a data processing system in which illustrative embodiments may be implemented.
Figure 3:
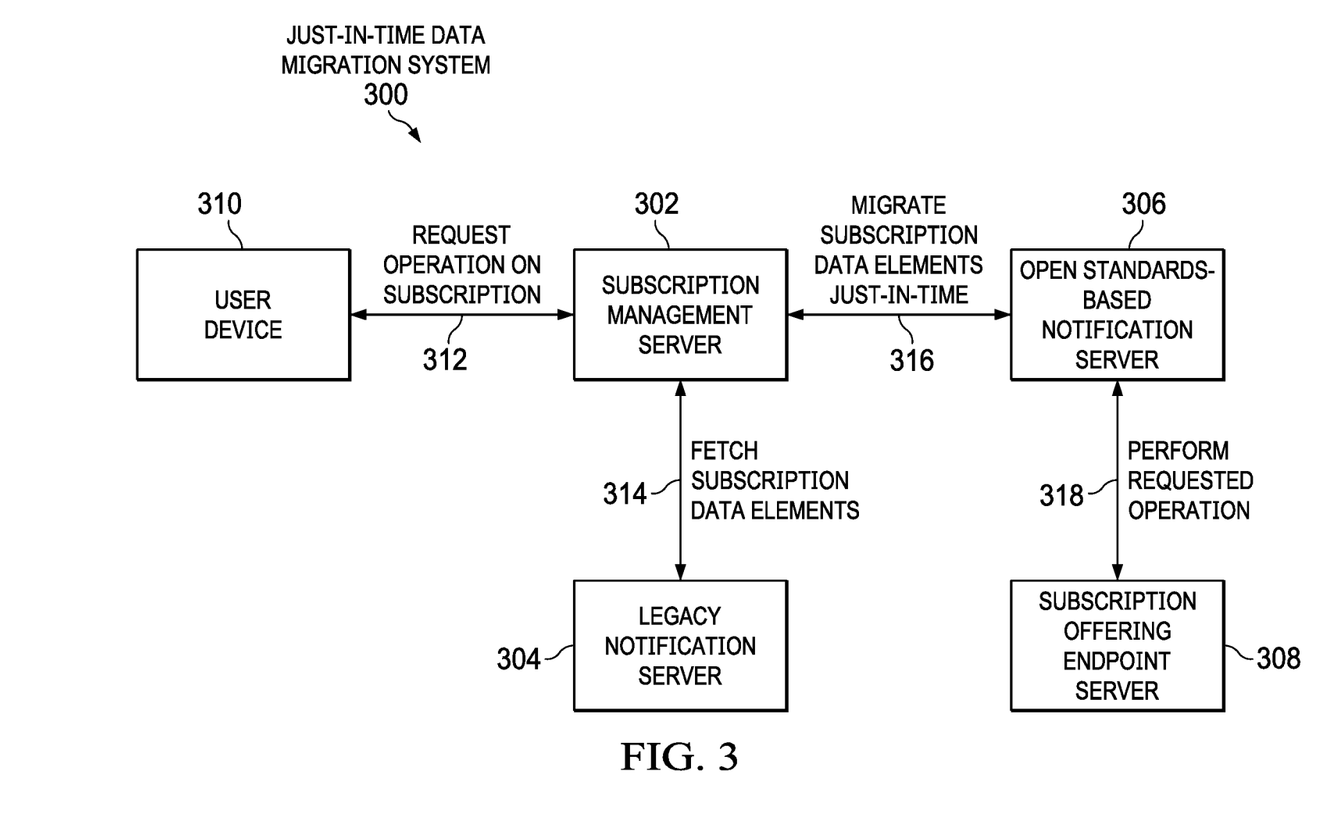
FIG. 3 is a diagram illustrating an example of a just-in-time data migration system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, subscription management server 104, notification server 106, and subscription offering endpoint server 108 connect to network 102, along with storage 110. Subscription management server 104, notification server 106, and subscription offering endpoint server 108 may be, for example, server computers with high-speed connections to network 102. In addition, subscription offering endpoint server 108 provides a set of one or more subscription services, such as, for example, financial services, governmental services, educational services, streaming data services, and the like, to registered client device users. Subscription management server 104 manages subscription life cycle events, such as, for example, creating a new subscription, modifying an existing subscription, and changing data elements, such as user name, password, email address, billing address, and the like, corresponding to an existing subscription, for the set of subscription services provided by subscription offering endpoint server 108. Further, subscription management server 104 utilizes notification server 106 to communicate the subscription life cycle event notification messages to subscription offering endpoint server 108. It should be noted that notification server 106 may represent an old legacy notification server or a new open standards-based notification server.

Also, it should be noted that subscription management server 104, notification server 106, and subscription offering endpoint server 108 may each represent computing nodes in one or more cloud environments that manage subscription services. Alternatively, subscription management server 104, notification server 106, and subscription offering endpoint server 108 may each represent servers in one or more data centers. Moreover, subscription management server 104 may provide information, such as, for example, programs and applications, software updates, software fixes, and the like, to notification server 106 and subscription offering endpoint server 108.

Client 112, client 114, and client 116 also connect to network 102. Clients 112, 114, and 116 are clients of subscription offering endpoint server 108. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, smart appliances, gaming devices, kiosks, and the like. Users of clients 112, 114, and 116 may utilize clients 112, 114, and 116 to access and utilize the set of subscription services provided by subscription offering endpoint server 108.

Storage 110 is a network storage device capable of storing any type of data in a structured format or an unstructured format. In addition, storage 110 may represent a plurality of network storage devices. Further, storage 110 may store identifiers and network addresses for a plurality of different servers, identifiers and network addresses for a plurality of different client devices, identifiers for a plurality of different users, and the like. Furthermore, storage 110 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on subscription offering endpoint server 108 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as subscription management server 104 in FIG. 1, in which computer readable program code or instructions implementing processes of illustrative embodiments may be located. Data processing system 200 contains or controls a set of one or more unused resources that are available for use by other resource provider data processing systems. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores just-in-time data migration manager 218. However, it should be noted that even though just-in-time data migration manager 218 is illustrated as residing in persistent storage 208, in an alternative illustrative embodiment just-in-time data migration manager 218 may be a separate component of data processing system 200. For example, just-in-time data migration manager 218 may be a hardware component coupled to communication fabric 202 or a combination of hardware and software components.

Just-in-time data migration manager 218 controls the process of migrating subscription data just-in-time from legacy notification system 220 to open standards-based notification system 222. Just-in-time means that just-in-time data migration manager 218 only migrates that portion of data corresponding to a requested operation on the subscription only when that particular portion of data is needed rather than migrating the data beforehand or migrating all of the data corresponding to the subscription en masse upon receiving the request to perform the operation. Just-in-time subscription data migration reduces system load, decreases network traffic, and increases system performance.

Legacy notification system 220 represents an identifier and network address for an old source legacy notification system that utilizes custom or proprietary network protocols to communicate with subscription offering endpoint 224. Open standards-based notification system 222 represents an identifier and network address for a new target open standards-based notification system that utilizes publicly available open standard network protocols to communicate with subscription offering endpoint 224. Just-in-time data migration manager 218 utilizes open standards-based notification system 222 to communicate subscription life cycle event notification messages to subscription offering endpoint 224 using a new identifier for the subscription that was generated by open standards-based notification system 222.

Subscription offering endpoint 224 represents an identifier and network address for the live subscription offering endpoint server that is hosting the subscription service corresponding to the requested operation. It should be noted that subscription offering endpoint 224 may represent identifiers for a plurality of different subscription offering endpoints that host a plurality of different subscription services to registered client device users.

Subscription 226 represents an identifier of a particular subscription corresponding to a particular service, such as, for example, a streaming stock market data service. However, it should be noted that subscription 226 may represent identifiers for a plurality of different subscription services. Data 228 represent any and all types of information that are related to subscription 226, such as, for example, subscriber name, subscriber identifier, service identifier, subscription identifier, subscription attributes, subscription start date, subscription end date, and the like.

Request 230 represents a request to perform operation 232 on subscription 226. Just-in-time data migration manager 218 receives request 230 from a subscriber of subscription 226 via a user device, such as a personal computer (e.g., client 112 in FIG. 1). Operation 232 may be, for example, to create subscription 226, which in this case subscription 226 would be a new subscription. Alternatively, operation 232 may be to modify subscription 226, which in this case subscription 226 would be an existing subscription. The modification to subscription 226 may be, for example, to add a set of analytics to a streaming stock market data service, change user preferences as to how the service displays information to the subscriber, or suspend the service for a period of time.

Just-in-time data migration manager 218 performs no-operation task 234 to trigger migration of unnecessary subscription data (e.g., subscription data used or accessed less often by subscribers or subscription data not required for particular subscription operations) from legacy notification system 220 to open standards-based notification system 222. Just-in-time data migration manager 218 runs no-operation task 234 within predefined network bandwidth throttling limits and migrates the subscription data in batches to minimize network load, for example.

As a result, data processing system 200 operates as a special purpose computer system in which just-in-time data migration manager 218 in data processing system 200 enables just-in-time migration of subscription data in a live subscription system. In other words, just-in-time data migration manager 218 transforms data processing system 200 into a special purpose computer system as compared to currently available general purpose computer systems that do not have just-in-time data migration manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the software industry, change is inevitable. Even though agile methodologies help manage software development life cycle in an ever-changing environment, technical aspects may be missed. One such technical aspect involves migration of data across environments. An environment may be, for example, software products, frameworks, data centers, and the like.

Data migration is a vital part of environment change, which may take the form of a software upgrade or design change or may be a result of legal requirements. Although one may argue that the need for data migration is limited to maintenance projects, that is not entirely accurate. In an agile environment, data migration may be needed at any point in the iterative model of the software development life cycle.

Data migration may involve multiple activities and operations. At a very basic level, data migration means the movement of data from one place to another. However, that is a simplistic view of data migration. More often than not, data migration involves some form of data transformation or recreation to conform to new schemas and standards that were the driving factors of the data migration. These data migration operations may be costly on network and database resources, which in turn slows down an entire system when done en masse.

Many current solutions utilize cold data migrations that result in down-time. Other current solutions utilize big bang data migrations (i.e., moving all data from one environment to the other at one time). This can be a painstaking process to both the product owners and the clients. As a result, a need exists for a more intelligent data migration process that migrates exactly what set of subscription data is needed and when that particular set of subscription data is needed.

As used herein, digital data are data created to represent digital business processes. This digital data (e.g., online retail or cloud-related transactions) are owned and hosted by the provider of the business. This also means that the onus of maintaining this digital data resides with the provider of the business.

Using an example of a subscription management platform, changes are done on data when an end user triggers some operation via a network. The operation may be, for example, paying a bill, changing a subscription plan, adding a user, and the like. The data corresponding to the operation only needs to be available at the time of the operation and so expending computing or human resources to move bulk data when all of the data is not going to be used is an unnecessary overhead. Illustrative embodiments enable migration of subscription data to a new environment only when the subscription data are needed and only migrates exactly what particular set of subscription data are needed to perform a particular operation.

More and more businesses are embracing open standards to increase interoperability, to increase reuse, and to reduce cost. This embracing of open standards is driving change in businesses re-evaluating their legacy systems. Moving data from a legacy system to a more modern target system utilizing open standards has the challenge of tackling data availability. This challenge is compounded when the target system is live and downtime is not an option.

For example, a subscription management system may use a legacy notification system that defines and implements custom protocols to notify subscription offering endpoints of subscription lifecycle events. To adopt to changing business needs, illustrative embodiments configure the subscription management system to use an open standards-based notification system. A subscription management system may have millions of subscriptions and the subscription offering endpoints may use data that originated in a legacy notification system to identify subscriptions. Moving this data to the new open standards-based notification system requires creation of new subscription identifiers in the new open standards-based notification system. This process of creating new subscription identifiers enables the subscription offering endpoints to transition from the old subscription identification data in the legacy notification system to the new subscription identification data in the new open standards-based notification system.

The subscription management system manages subscription lifecycles and generates notifications on subscription creation, update, state change, and the like. The legacy notification system defines custom protocols for subscription offering endpoints to receive subscription lifecycle messages. The legacy notification system also receives messages from the subscription management system and generates event notifications to the subscription offering endpoints. The open standard-based notification system utilizes an open standard to communicate with the subscription offering endpoints. The open standard-based notification system also receives messages from the subscription management system and generates event notifications to the subscription offering endpoints. The subscription offering endpoint (e.g., service broker) is a live system hosting the subscription service. The subscription offering endpoint receives the subscription life cycle notification messages and performs the requested operations, such as, for example, provisioning a new instance of a subscription, modifying an existing subscription, suspending a subscription, terminating a subscription, adding a new user to a subscription, removing a user from a subscription, changing related data, such as billing address, to a subscription, and the like.

Challenges may include, for example, providing a mechanism to migrate large amounts of data, handling a large number of transactions every day, minute, or second, losing data during static migration or cut-off migration, preventing downtime when downtime is not an option as the system is live and being used extensively, and receiving subscription life cycle notification messages to perform the requested operations in real time.

cation system removes the old subscription identifier via a background job on a predetermined time interval basis, such as, for example, once a day.

Initially, a user logs in via a user interface and requests a new subscription. The subscription management system receives the new subscription request. The subscription management system sends a notification regarding the new subscription request to the appropriate subscription offering endpoint via the open standards-based notification system. This new subscription request does not involve any data migration. A format of the payload that the subscription management system sends via the open standards-based notification system to the subscription offering endpoint may be, for example:

```
{
    "context": {
        "crn": "crn:v1:service:global:b4a6d781-677f-42b7-931b-XXXXXXXXXX94::",
        "organization": {
        },
    },
    "parameters": {
    "type": "Trial"
    },
    "plan_id": "XXXXXXX68-c6283d4c2d82",
    "service_id": "0334ada2-e319-4c5a-XXXXXXXXXXbd4af"
}.
```

Whenever a user requests a subscription lifecycle change, the subscription management system of illustrative embodiments sends the subscription data just-in-time to the new open standards-based notification system. If the user is requesting a new subscription, then no data migration from the legacy notification system is needed. Thus, in this case the new open standards-based notification system sends a notification to the subscription offering endpoint. If the subscription already exists and the user is requesting an update to the subscription or other type of subscription lifecycle event, then the subscription management system performs a pre-check to determine whether identification data corresponding to the subscription exists in the legacy notification system. If identification data corresponding to the subscription exists in the legacy notification system, then the open standards-based notification system generates a new subscription identifier. The open standards-based notification system sends a subscription life cycle event notification message to the subscription offering endpoint as if a new subscription is being created. The open standards-based notification system also includes a flag indicating that the new subscription identifier is replacing the old subscription identifier of the legacy notification system. Afterward, the subscription offering endpoint performs the user-desired operation (e.g., subscription update, suspend, resume, or the like) and sets the subscription identifier to that of the newly generated subscription identifier. From this point forward, the subscription offering endpoint now uses the new subscription identifier to identify which particular subscription to perform an operation on. In addition, the legacy notifi- The open standards-based notification system generates the new subscription identifier. The new subscription identifier is a unique identifier, such as, for example, a cloud resource name ("crn") that uniquely identifies a cloud resource (i.e., a particular subscription). The open standards-based notification system utilizes the cloud resource name to specify the subscription in a way that is unambiguous and guaranteed to be globally unique. The open standards-based notification system generates the cloud resource name from a concatenation of "segments" that hierarchically identify the subscription, the subscription's location, and the service the subscription belongs to. The segment delimiter is a colon character (i.e., ':'). Afterward, the subscription management system uses the cloud resource name as the subscription identifier for all future operations.

When an existing subscription is due for suspension or renewal or if the user performs an update to the existing subscription, the subscription management system triggers a subscription life cycle event. The subscription management system then performs a pre-check to determine whether the identifier for the subscription exists in the legacy notification system. If the subscription identifier exists in the legacy notification system, then subscription management system directs the open standards-based notification system to generate a new subscription identifier for the subscription. Further, the subscription management system sends the subscription life cycle event notification message to the appropriate subscription offering endpoint via the open standards-based notification system as if a new subscription is being created and sets a data migration flag to true. An example of the payload format that the subscription management system sends to the subscription offering endpoint may be:

```
{
    "context": {
        "sub_migration": true,
        "legacy_subscription_id": "df7396db623XXXXXXXXXXXXXXXXX28",
        "crn": "crn:v1:service:global:b4a6d781-677f-42b7-931b-XXXXXXXXXXX94::"
        "organization": {
        },
    },
    "parameters": {
    "type": "Trial"
    },
    "plan_id": "XXXXXXX68-c6283d4c2d82",
    "service_id": "0334ada2-e319-4c5a-XXXXXXXXXXbd4af"
}.
```

The subscription offering endpoint identifies the migration flag in the payload and replaces the old subscription identifier (i.e., the legacy notification system subscription identifier—"legacy_subscription_id") with the new subscription identifier (i.e., "crn"), which was generated by the open standards-based notification system, in the subscription offering endpoint's database. A response from the subscription offering endpoint to the subscription management system may be, for example:

```
{
    "metadata": {
    },
    "httpStatus": "201"
},
``` which indicates that the subscription identifier replacement operation was a success (i.e., the old legacy notification system subscription identifier was successfully replaced with the new open standards-based notification system subscription identifier).

The subscription offering endpoint then performs the user-requested subscription operation, such as create, suspend, resume, update, or the like. A format for the payload that the subscription management system sends to the subscription offering endpoint regarding the operation may be, for example:

```
{
    "context": {
        "sub_migration": false,
        "crn": "crn:v1:service:global:b4a6d781-677f-42b7-931b-XXXXXXXXXXX94::"
        "organization": { },
    },
    "parameters": {
    "display_name": "",
    "order_data":
        "creation_date": "2018-06-05T09:21:30.000Z",
        "expiration_date": "2018-06-19T09:21:28.000Z"
    },
    "quantity": "1",
    "subscription_attributes": {
    }
}
}.
```

It should be noted that in the above example the data migration flag is set to false because the data migration is complete at this point. Upon completion of the user-requested subscription operation on the subscription offering endpoint, the subscription offering endpoint sends a payload to the subscription management system regarding completion of the operation, such as, for example:

```
{
    "metadata": {
    },
    "httpStatus": "201"
},
``` which indicates that the user-requested subscription operation was a success (i.e., the subscription offering endpoint successfully performed the operation on the server). Illustrative embodiments perform all future operations on the subscription using the new subscription identifier created by the open standards-based notification system. As a result, transition to new subscription management system, based on open standards notification system is seamless, with zero downtime, as data migration of the subscription information is performed just-in-time as part of the user-requested subscription operation in the live subscription offering endpoint system. Consequently, illustrative embodiments increase system performance.

Thus, illustrative embodiments provide one or more technical solutions that overcome a technical problem with migrating subscription data in a live system just-in-time to prevent system downtime. As a result, these one or more technical solutions provide a technical effect and practical application in the field of just-in-time subscription data migration.

With reference now to FIG. 3, a diagram illustrating an example of a just-in-time data migration system is depicted in accordance with an illustrative embodiment. Just-in-time data migration system 300 may be implemented in a network of data processing systems, such as network data processing system 100 in FIG. 1. Just-in-time data migration system 300 is a system of hardware and software components for migrating subscription data just-in-time from a source legacy system to a new target system.

In this example, just-in-time data migration system 300 includes subscription management server 302, legacy notification server 304, open standards-based notification server 306, subscription offering endpoint server 308, and user device 310. However, it should be noted that just-in-time data migration system 300 is intended as an example only and not as a limitation on illustrative embodiments. In other words, just-in-time data migration system 300 may include any number and type of servers and other devices.

Subscription management server 302 manages subscription lifecycle events, such as creating new subscriptions, modifying existing subscriptions, and the like, for one or more subscription services. Subscription management server 302 may be, for example, subscription management server 104 in FIG. 1. Legacy notification server 304 utilizes custom protocols for communicating subscription lifecycle event notification messages to subscription offering endpoints, such as subscription offering endpoint server 308. Open standard-based notification server 306 utilizes open standard protocols to communicate subscription lifecycle event notification messages to the subscription offering endpoints. Open standard-based notification server 306 may be, for example, notification server 106 in FIG. 1. Subscription offering endpoint server 308 provides a live subscription service to registered subscribers. Subscription offering endpoint server 308 receives the subscription life cycle event notification messages and performs a set of one or more operations corresponding to the subscription life cycle events. Subscription offering endpoint server 308 may be, for example, subscription offering endpoint server 108 in FIG. 1. User device 310 may be, for example, client 112 in FIG. 1. A registered subscriber of the subscription service provided by subscription offering endpoint server 308 utilizes user device 310 to receive the service associated with the subscription.

In subscription life cycle management of illustrative embodiments, multiple subscription data elements flow between servers, which migrate the subscription data elements just-in-time. For example, at 312 when subscription management server 302 receives a request to perform an operation on a subscription from user device 310, subscription management server 302 makes a few decisions before performing any operation on the subscription. If the operation is to modify or update the subscription, then subscription management server 302 determines whether data elements corresponding to the subscription already exist in open standards-based notification server 306. If data elements corresponding to the subscription already exist in open standards-based notification server 306, then subscription management server 302, via open standards-based notification server 306, directs subscription offering endpoint server 308 to perform the operation associated with the request as there is no need for migration of subscription data elements from legacy notification server 304. If data elements corresponding to the subscription do not exist in open standards-based notification sever 306, then subscription management server 302 sets a data migration flag to true and at 314 makes a just-in-time call to legacy notification server 304 to fetch the data elements corresponding to the subscription. Then, at 316 subscription management sever 302 migrates the data elements corresponding to the subscription just-in-time to open standards-based notification server 306 and directs open standards-based notification server 306 to generate a new identifier for the subscription based on the data elements migrated from legacy notification server 304.

Afterward, at 318 subscription management server 302, via open standards-based notification server 306, directs subscription offering endpoint server 308 to perform the requested operation on the subscription using the new identifier corresponding to the subscription.

Further, subscription management server 302 identifies transformations that are required for the subscription data elements, such as, for example, structurally, syntactically, and semantically, and notifies open standards-based notification server 306 of these data transformations. Open standards-based notification server 306 then sends an indication just-in-time to subscription offering endpoint server 308 on the nature of the transformations to the subscription data elements. Thus, illustrative embodiments enable subscription data element migration from an old source legacy notification system to a new target open standards-based notification system when the two systems differ in the way the two systems represent the subscription data elements to subscription offering endpoints in terms of structure, syntax, semantics, and identifiers.

Figure 4:
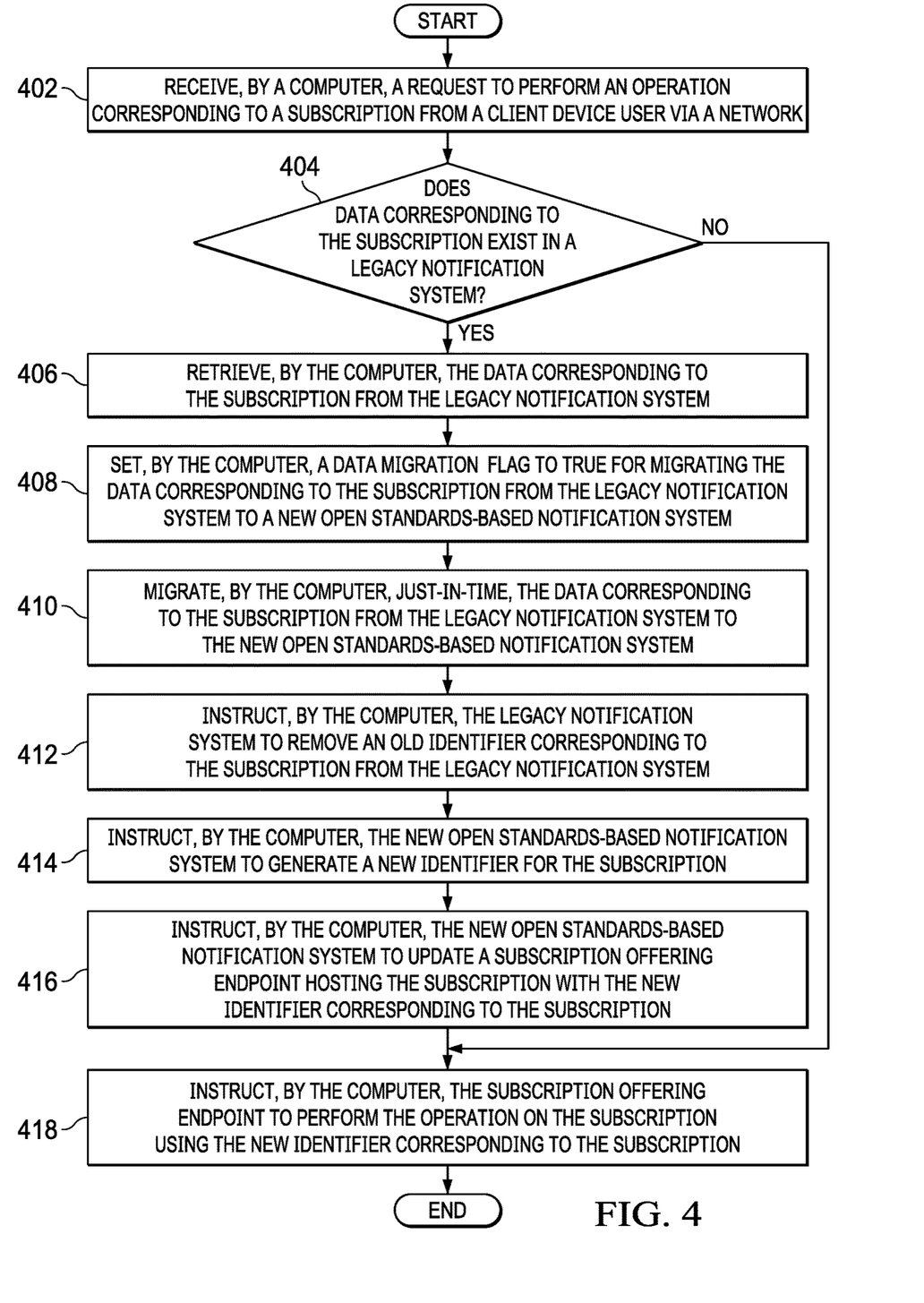
FIG. 4 is a flowchart illustrating a process for just-in-time data migration in accordance with an illustrative embodiment.

With reference now to FIG. 4, a flowchart illustrating a process for just-in-time data migration is shown in accordance with an illustrative embodiment. The process shown in FIG. 4 may be implemented in a computer, such as, for example, subscription management server 104 in FIG. 1 or data processing system 200 in FIG. 2.

The process begins when the computer receives a request to perform an operation corresponding to a subscription from a client device user via a network (step 402). In response to receiving the request in step 402, the computer makes a determination as to whether data corresponding to the subscription exists in a legacy notification system (step 404). If the computer determines that data corresponding to the subscription does exist in the legacy notification system, yes output of step 404, then the computer retrieves the data corresponding to the subscription from the legacy notification system (step 406).

In addition, the computer sets a data migration flag to true for migrating the data corresponding to the subscription from the legacy notification system to a new open standards-based notification system (step 408). Further, the computer migrates just-in-time the data corresponding to the subscription from the legacy notification system to the new open standards-based notification system (step 410). Furthermore, the computer instructs the legacy notification system to remove an old identifier corresponding to the subscription from the legacy notification system (step 412).

Moreover, the computer instructs the new open standards-based notification system to generate a new identifier for the subscription (step 414). The computer also instructs the new open standards-based notification system to update a subscription offering endpoint hosting the subscription with the new identifier corresponding to the subscription (step 416). In addition, the computer instructs the subscription offering endpoint to perform the operation on the subscription using the new identifier corresponding to the subscription (step 418). Thereafter, the process terminates.

Returning again to step 404, if the computer determines that data corresponding to the subscription does not exist in the legacy notification system, no output of step 404, then the process proceeds to step 418 where the computer instructs the subscription offering endpoint to perform the operation on the subscription. Thereafter, the process terminates.

Figure 5:
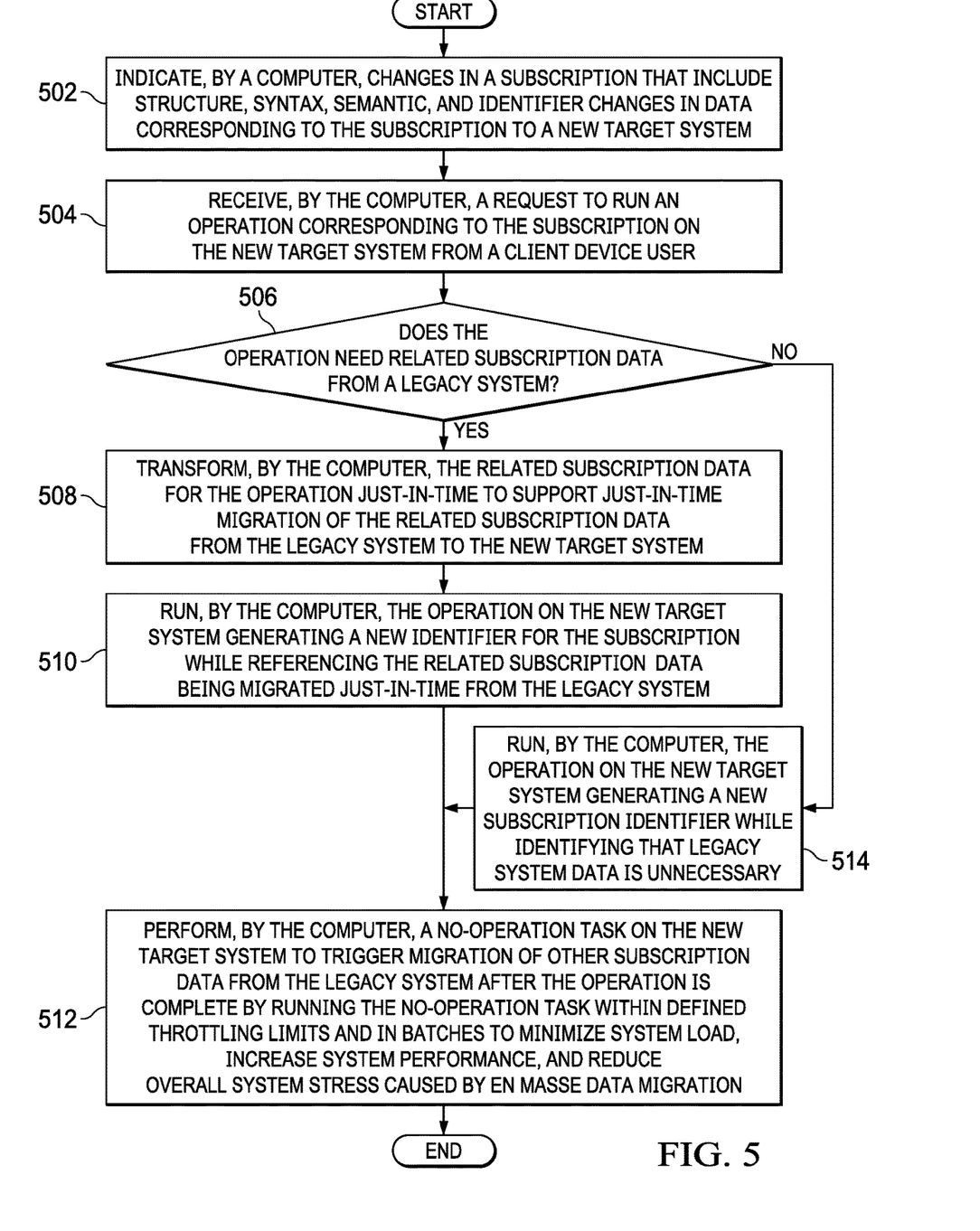
FIG. 5 is a flowchart illustrating a process for running an operation on a new target system in accordance with an illustrative embodiment.

With reference now to FIG. 5, a flowchart illustrating a process for running an operation on a new target system is shown in accordance with an illustrative embodiment. The process shown in FIG. 5 may be implemented in a computer, such as, for example, subscription management server 104 in FIG. 1 or data processing system 200 in FIG. 2.

The process begins when the computer indicates changes in a subscription, which include structure, syntax, semantic, and identifier changes in data corresponding to the subscription, to a new target system (step 502). The computer receives a request to run an operation corresponding to the subscription on the new target system from a client device user (step 504). The computer makes a determination as to whether the operation needs related subscription data from a legacy system (step 506).

If the computer determines that the operation does need the related subscription data from the legacy system, yes output of step 506, then the computer transforms the related subscription data for the operation just-in-time to support just-in-time migration of the related subscription data from the legacy system to the new target system (step 508). In addition, the computer runs the operation on the new target system generating a new identifier for the subscription while referencing the related subscription data being migrated just-in-time from the legacy system (step 510). Further, the computer performs a no-operation task on the new target system to trigger migration of other subscription data from the legacy system after the operation is complete by running the no-operation task within defined throttling limits and in batches to minimize system load, increase system performance, and reduce overall system stress caused by en masse data migration (step 512). Thereafter, the process terminates.

Returning again to step 506, if the computer determines that the operation does not need any related subscription data from the legacy system, no output of step 506, then the computer runs the operation on the new target system generating the new subscription identifier while identifying that legacy system data is unnecessary (step 514). Thereafter, the process returns to step 512 where the computer performs the no-operation task on the new target system to trigger the migration of the other subscription data from the legacy system after the operation is complete.

Thus, illustrative embodiments of the present invention provide a computer-implemented method, computer system, and computer program product for migrating subscription data just-in-time from an old legacy system to a new target system. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for just-in-time data migration in a live system, the method comprising:
   indicating, by a computer, changes in a subscription that include structure, syntax, semantic, and identifier changes in data corresponding to the subscription to a new target system, wherein the computer is communicatively coupled with a client device and with the new target system;
   receiving, by the computer, from the client device, a request to run a subscription operation on the new target system, the subscription operation corresponding to the subscription on the new target system;
   determining, by the computer, whether the subscription operation requires related subscription data from a legacy system;
   responsive to the computer determining that the subscription operation requires the related subscription data from the legacy system, transforming, by the computer, the related subscription data required for the subscription operation just-in-time to support just-in-time migration of the related subscription data required for the subscription operation from the legacy system to the new target system;
   running, by the computer, the subscription operation on the new target system generating a new identifier for the subscription while referencing the related subscription data being migrated just-in-time from the legacy system; and
   performing, by the computer, a no-operation task on the new target system to trigger migration of other subscription data that was not required for the requested subscription operation from the legacy system after the subscription operation is complete on the new target system by running the no-operation task within defined throttling limits and in batches to minimize system load, increase system performance, and reduce overall system stress caused by en masse data migration.

2. The method of claim 1 further comprising:
responsive to the computer determining that the subscription operation does not need any related subscription data from the legacy system, running, by the computer, the subscription operation on the new target system generating a new subscription identifier while identifying that legacy system data is unnecessary.

3. The method of claim 1 further comprising:
setting, by the computer, a data migration flag to true for migrating the related subscription data from the legacy system to the new target system; and
migrating, by the computer, just-in-time the related subscription data from the legacy system to the new target system.

4. The method of claim 3, wherein the computer only migrates that portion of subscription data corresponding to the subscription operation on the subscription only when that particular portion of subscription data is needed and not before.

5. The method of claim 1 further comprising:
instructing, by the computer, the legacy system to remove an old identifier corresponding to the subscription from the legacy system; and
instructing, by the computer, the new target system to generate the new identifier for the subscription.

6. The method of claim 1 further comprising:
instructing, by the computer, the new target system to update a subscription offering endpoint hosting the subscription with the new identifier corresponding to the subscription.

7. The method of claim 6 further comprising:
instructing, by the computer, the subscription offering endpoint to perform the subscription operation on the subscription using the new identifier corresponding to the subscription.

8. The method of claim 1, wherein the legacy system is a legacy notification system, and wherein the new target system is an open standards-based notification system, and wherein the legacy notification system utilizes custom protocols to communicate with a subscription offering endpoint, and wherein the open standards-based notification system utilizes open standard protocols to communicate with the subscription offering endpoint.

9. The method of claim 1, wherein the new identifier for the subscription is a cloud resource name that uniquely identifies the subscription, and wherein the new target system generates the cloud resource name from a concatenation of segments that identify the subscription, a location of the subscription, and a service the subscription belongs to.

10. A computer program product for just-in-time data migration in a live system, the computer program product comprising a computer readable storage medium having program instructions embodied therewith, the program instructions executable by a computer to cause the computer to perform a method comprising:

indicating, by the computer, changes in a subscription that include structure, syntax, semantic, and identifier changes in data corresponding to the subscription to a new target system;

receiving, by the computer, a request to run an operation corresponding to the subscription on the new target system from a client device user;

determining, by the computer, whether the operation needs related subscription data from a legacy system;

responsive to the computer determining that the operation does need the related subscription data from the legacy system, transforming, by the computer, the related subscription data for the operation just-in-time to support just-in-time migration of the related subscription data from the legacy system to the new target system;

running, by the computer, the operation on the new target system generating a new identifier for the subscription while referencing the related subscription data being migrated just-in-time from the legacy system; and performing, by the computer, a no-operation task on the new target system to trigger migration of other subscription data from the legacy system after the operation is complete by running the no-operation task within defined throttling limits and in batches to minimize system load, increase system performance, and reduce overall system stress caused by en masse data migration.

11. The computer program product of claim 10 further comprising:

responsive to the computer determining that the operation does not need any related subscription data from the legacy system, running, by the computer, the operation on the new target system generating a new subscription identifier while identifying that legacy system data is unnecessary.

12. The computer program product of claim 10 further comprising:

setting, by the computer, a data migration flag to true for migrating the related subscription data from the legacy system to the new target system; and migrating, by the computer, just-in-time the related subscription data from the legacy system to the new target system.

13. The computer program product of claim 12, wherein the computer only migrates that portion of subscription data corresponding to the operation on the subscription only when that particular portion of subscription data is needed and not before.

14. The computer program product of claim 10 further comprising:

instructing, by the computer, the legacy system to remove an old identifier corresponding to the subscription from the legacy system; and instructing, by the computer, the new target system to generate the new identifier for the subscription.

15. The computer program product of claim 10 further comprising:

instructing, by the computer, the new target system to update a subscription offering endpoint hosting the subscription with the new identifier corresponding to the subscription.

16. The computer program product of claim 15 further comprising:

instructing, by the computer, the subscription offering endpoint to perform the operation on the subscription using the new identifier corresponding to the subscription.

17. A computer system for just-in-time data migration in a live system, the computer system comprising:

a bus system;

a storage device connected to the bus system, wherein the storage device stores program instructions; and a processor connected to the bus system, wherein the processor is communicatively coupled with a client device and with a new target system, and wherein the processor executes the program instructions to:

indicate changes in a subscription that include structure, syntax, semantic, and identifier changes in data corresponding to the subscription to the new target system;

receive, from the client device, a request to run a subscription operation on the new target system, the subscription operation corresponding to the subscription on the new target system;

determine whether the subscription operation requires related subscription data from a legacy system;

transform the related subscription data required for the subscription operation just-in-time to support just-in-time migration of the related subscription data required for the subscription operation from the legacy system to the new target system in response to determining that the subscription operation requires the related subscription data from the legacy system;

run the subscription operation on the new target system generating a new identifier for the subscription while referencing the related subscription data being migrated just-in-time from the legacy system; and perform a no-operation task on the new target system to trigger migration of other subscription data that was not required for the requested subscription operation from the legacy system after the subscription operation is complete on the new target system by running the no-operation task within defined throttling limits and in batches to minimize system load, increase system performance, and reduce overall system stress caused by en masse data migration.

18. The computer system of claim 17, wherein the processor further executes the program instructions to:

run the subscription operation on the new target system generating a new subscription identifier while identifying that legacy system data is unnecessary.

19. The computer system of claim 17, wherein the processor further executes the program instructions to:

set a data migration flag to true for migrating the related subscription data from the legacy system to the new target system; and migrate just-in-time the related subscription data from the legacy system to the new target system.

20. The computer system of claim 19, wherein the processor only migrates that portion of subscription data corresponding to the subscription operation on the subscription only when that particular portion of subscription data is needed and not before.

\* \* \* \* \*